(12) United States Patent
Tondera et al.

(10) Patent No.: US 12,116,214 B2
(45) Date of Patent: Oct. 15, 2024

(54) DEVICE FOR MANIPULATING AN OBJECT, METHOD FOR FILLING AN OBJECT, AND CORRESPONDING USE

(71) Applicant: TT Innovation AG, Zug (CH)

(72) Inventors: Marc Tondera, Riehen (CH); Tobias Jan Schneidler, Hagendorn (CH); Julia Annette Carli, Basel (CH); Mathieu Müller, Sierentz (FR); Philipp Leuenberger, Basel (CH); Christophe Rethoret, Issenheim (FR); Mike Zeller, Wahlen (CH)

(73) Assignee: TT Innovation AG, Zug (CH)

( * ) Notice: Subject to any disclaimer, the term of this patent is extended or adjusted under 35 U.S.C. 154(b) by 0 days.

(21) Appl. No.: 18/008,735

(22) PCT Filed: Jun. 17, 2022

(86) PCT No.: PCT/EP2022/066602
§ 371 (c)(1),
(2) Date: Dec. 22, 2022

(87) PCT Pub. No.: WO2022/263651
PCT Pub. Date: Dec. 22, 2022

(65) Prior Publication Data
US 2024/0228184 A1 Jul. 11, 2024

(30) Foreign Application Priority Data

Jun. 18, 2021 (EP) .................................... 21180412

(51) Int. Cl.
*B65G 47/24* (2006.01)

(52) U.S. Cl.
CPC .................................... *B65G 47/24* (2013.01)

(58) Field of Classification Search
CPC ................................. B65G 47/24; B25J 9/123
(Continued)

(56) References Cited

U.S. PATENT DOCUMENTS

| 5,126,648 A | * | 6/1992 | Jacobs | ................... H02K 41/03 318/135 |
| 6,147,421 A | * | 11/2000 | Takita | ................... H02K 41/03 318/135 |

(Continued)

FOREIGN PATENT DOCUMENTS

| CN | 103547519 A | 1/2014 |
| CN | 112841512 A | 5/2021 |

(Continued)

OTHER PUBLICATIONS

Lilienthal Peter F II et al: "A Flexible Manufacturing Workstation", AT & T Technical Journal, American Telephone and Telegraph Co. New York, US, vol. 67, Nr. 2, pp. 5-14, Apr. 1, 1988 (Apr. 1, 1988).

(Continued)

*Primary Examiner* — Jason K Niesz
(74) *Attorney, Agent, or Firm* — Volpe Koenig (57) ABSTRACT

A device (1) for manipulating an object (3), wherein the object (3) is movable contactlessly on a drive surface by at least one mover (4) which is magnetically coupled to a stator arrangement (5). The drive surface (7) is configured as a sealed border, in particular as a boundary wall (8), of a protected interior (9). The use of such a flexible device (1) is preferably of interest in the foodstuff industry or pharmaceutical industry, but is not restricted to these sectors.

17 Claims, 5 Drawing Sheets

(58) Field of Classification Search
USPC .......................................................... 141/275
See application file for complete search history.

(56) References Cited

U.S. PATENT DOCUMENTS

| | | | |
|---|---|---|---|
| 6,208,045 B1 * | 3/2001 | Hazelton | ................ H02K 41/03 |
| | | | 414/935 |
| 2008/0029368 A1 | 2/2008 | Komori | |
| 2019/0016484 A1 | 1/2019 | Diaz Guerrero | |
| 2020/0262060 A1 | 8/2020 | Hosek et al. | |

FOREIGN PATENT DOCUMENTS

| | | |
|---|---|---|
| DE | 102019215745 | 4/2021 |
| EP | 3945046 A1 | 2/2022 |
| JP | H08012077 A | 1/1989 |
| JP | H01116065 A | 5/1989 |
| JP | H0533064 B2 | 5/1993 |
| JP | 3117063 U | 9/2015 |
| WO | 2021115545 A1 | 6/2021 |
| WO | 2022238429 A1 | 11/2022 |

OTHER PUBLICATIONS https://www.youtube.com/watch?v=9H4jUptw4Vk—Wall of Death, posted May 26, 2013.

\* cited by examiner

DEVICE FOR MANIPULATING AN OBJECT, METHOD FOR FILLING AN OBJECT, AND CORRESPONDING USE

TECHNICAL FIELD

The invention concerns a device for manipulating an object, wherein the object is movable contactlessly on a drive surface by at least one mover which is magnetically coupled to a stator arrangement.

The invention furthermore concerns a method for filling an object which is transported by a mover on a boundary wall of a protected interior to a filling device and filled by the filling device.

The invention furthermore concerns the use of a boundary wall of a protected interior as a drive surface.

BACKGROUND

It is usual to carry out special production processes which require a controlled and/or sterile environment in protected interior spaces. Such protected interiors include inter alia clean rooms, such as for example isolators, containments or radioactively charged rooms. Protected interiors are often used inter alia in the production of semiconductors, in the aviation and aerospace industry, and in the aseptic production or packing of foodstuffs and pharmaceutical or cosmetic products. Semi- or fully automated process steps are largely used for optimising the special production processes. However, often widely varying process steps are carried out by human hand, which can lead to contamination of the products to be produced even if the process is carried out inside a protected interior space.

Devices for manipulating objects are known in the industry. Manipulation here may for example be any process which may take place in a device for processing and/or production of a product. For example, in the pharmaceutical industry, injection vials are conducted via a conventional flow conveyor, a transport star or transport rake firstly to a filling device where they are filled, in order then to be transported on to further process stations via the flow conveyor. Such systems may be relatively inflexible, susceptible to fault and maintenance-intensive.

Recently, devices for manipulating objects have been known, in which a transport body known as a mover is movable and/or rotatable in at least two degrees of freedom, preferably contactlessly in an electromagnetic field. The mover is magnetically coupled to a stator arrangement (planar motor system) and levitates contactlessly a few millimetres above the stator arrangement. The stator arrangement consists of at least one sheet packet and may be positioned in modular fashion and modified to the existing spatial conditions.

SUMMARY

The invention is based on the object of expanding the use of protected interiors and making this more flexible.

To achieve said object, one or more features according to the are provided. In particular, to achieve said object in a device of the type described initially, it is provided that the drive surface is configured as a sealed border, in particular as a boundary wall, of a protected interior. According to the invention, this may include the entirety of the boundary walls or parts thereof. Thus the drive surface may also extend onto further, possibly non-horizontal, surfaces within the protected interior, whereby an expanded functionality and/or work capacity and/or greater flexibility can be achieved. Thus the stator arrangement may be formed on the boundary wall of the protected interior, whereby at the same time space and materials can be saved.

It is advantageous here that transport in the protected interior is abrasion-free. Thus less cost is required for cleaning. This also achieves that during production, no particles are released which could cause contamination, for example during filling.

In a further advantageous embodiment of the invention, it may be provided that the stator arrangement is arranged outside a protected interior. Thus the stator arrangement can be isolated from the conditions in the interior. For example, it may be provided that the stator arrangement is attached to a boundary wall. This gives a particularly compact variant. It may be provided here that the boundary wall is arranged vertically and/or horizontally and/or sloping. Thus boundary walls with different orientation may be used.

In an embodiment of the invention, it may be provided that the at least one mover is arranged in the protected interior. It is advantageous here that many processes, in particular conveying and/or transport processes, can be carried out in the protected interior without manual intervention. A controlled exchange of air for example between the interior and the environment can thus be achieved. Such a controlled exchange is of great importance for aseptic applications with isolators or for toxic processes in containments. Furthermore, in some cases costly and time-consuming clean-room tests, in the form of e.g. microbiological culture plates, can be reduced. The design may for example allow the at least one mover to be operated in an interior into which no substances can enter uncontrolledly from the outside and/or from which no substances may escape uncontrolledly to the outside.

It may furthermore be provided that the at least one mover is arranged outside a protected interior. For a functional arrangement, accordingly a corresponding stator arrangement may be encased within the protected interior. Thus, advantageously, processes can be carried out outside the protected interior. This may prevent particles and/or contaminants caused and/or released by or at the stator arrangement escaping uncontrolledly from the interior.

In a further advantageous embodiment of the invention, it may be provided that the boundary wall of the protected interior has a coupling region of the stator arrangement and the at least one mover, in particular wherein the surface area inside the coupling region may be smaller than the surface area of the boundary wall. Here it is advantageous that further devices may be arranged outside the coupling region and/or in the protected interior, for example magnetically non-neutral devices and/or structures which may influence or interfere with the magnetic field or free movement region of the movers.

For example, gripper devices, weighing devices, closing systems, filling devices or conventional transport systems for manipulating containers may be arranged outside the coupling region.

In a further advantageous embodiment of the invention, it may be provided that the boundary wall and/or a, in particular the above-mentioned, coupling region is made of a magnetically neutral separating layer. Magnetically neutral in the sense of the invention means that the materials used can reduce or avoid an interference or deterioration in a magnetic coupling between the mover and stator arrangement.

For example, the separating layer may be made of or comprise a special steel and/or glass. Alternatively or additionally, the separating layer may also be made of a gas-tight plastic and/or composite material. Thus particularly suitable materials for protected interiors may be used.

Preferably, the separating layer is less than 2 mm thick. Thus the mover may be moved very close to the stator arrangement for a strong magnetic coupling.

In one embodiment of the invention, it may be provided that the boundary wall and/or a, e.g. the above-mentioned, coupling region is stabilised by carrier components. The use of carrier components is advantageous for the statics of the device.

Here it is favourable if the carrier components are made of magnetically neutral materials. Thus a fault with the coupling and/or deformation of the magnetic fields can be reduced or even avoided. This is particularly advantageous in connection with a magnetically neutral separating layer.

In a further advantageous embodiment of the invention, it may be provided that the stator arrangement is constructed in at least one rack. Here it is advantageous if the stator arrangement can be stabilised in the at least one rack.

It is favourable here if the at least one rack is mounted directly on the boundary wall and/or on a, e.g. the above-mentioned, coupling region. Thus the stator arrangement can be provided very close to the mover for a magnetic coupling.

Alternatively, the rack may also be positioned freely on the boundary wall and/or the coupling region in order to allow a more flexible movement of the rack.

Preferably, the at least one rack is movable from and to a usage site, and/or at the usage site can be adjusted between a working position close to the boundary wall and a position remote from the boundary wall. Since stator arrangements must be accessible, for example for maintenance and/or repair work, an embodiment of the stator arrangement in movable racks is advantageous. The rack may also advantageously travel to a position remote from the boundary wall, whereby stator arrangements can be extracted without themselves being damaged or causing damage to the boundary wall.

In a further advantageous embodiment of the invention, it may be provided that the boundary wall and/or the separating layer is removable from the device. It is advantageous here that the boundary wall and/or the separating layer can be extracted from the interior, whereby stator arrangements can be made accessible for economic maintenance.

In a further advantageous embodiment of the invention, it may be provided that the protected interior has at least two chambers, in particular wherein the at least two chambers are separated by an intermediate wall which preferably has at least one small access opening. It is advantageous here that different process steps of a method can be separated from one another in order to eliminate further sources of contamination and/or particles. The at least one small access opening according to the invention allows the transport of e.g. open vessels from one chamber to a further chamber in order to be filled and/or closed there.

Preferably, the intermediate wall is configured as a boundary wall at which the further processes can be carried out separately from one another.

Alternatively or additionally, in one of the chambers a positive pressure may be generated so that no contamination or particles from the other chamber can enter this chamber through at least one small access opening.

In a further advantageous embodiment of the invention, it may be provided that at least one process station is mounted fixedly or arranged on a mover in the protected interior. Thus objects can be processed flexibly in the protected interior throughout the entire manipulation process.

For example, a filling device may be fixedly mounted or positioned on a mover. A filling device allows regulation of the fill level of an object.

Preferably, the at least one processing station is situated on the boundary wall and/or in a, e.g. the above-mentioned, coupling region. In this way, highly advantageously, a multistage production process can be implemented in modular and dynamic fashion, since the movers can travel substantially freely on the drive surface and travel routes can easily be modified, in particular when the interior is closed and/or without moving parts. The modularity and dynamics according to the invention allow a method and/or process to be adapted and modified rapidly without endangering the protected clean room.

It is furthermore possible that the process station is arranged in one chamber and fixed in a second chamber. It is advantageous here that the process station can be positioned fixedly in one chamber, secure against contamination, and introduced into a second chamber for processing. For example, a process station may be introduced through an opening, for example through a lock, from one chamber to a second chamber.

In a further advantageous embodiment of the invention, it may be provided that the stator arrangement is fixed on the boundary walls and/or a, in particular the above-mentioned, coupling region, and/or two adjacent walls of the protected interior, such that the at least one mover can transport the at least one object inside the at least two chambers and/or through the at least one small access opening of the intermediate wall between the at least two chambers. It is advantageous here that working steps in which particles or contaminants may be released can be separated from following working steps. Thus a contamination transfer can be reduced or even prevented.

In a further advantageous embodiment of the invention, it may be provided that the stator arrangement is arranged preferably vertically inside the at least one intermediate wall between the at least two chambers. It is advantageous here that the at least one intermediate wall provides a drive surface for movers for lifting movements.

Alternatively or additionally, the at least one intermediate wall may also be produced as a coupling region which may comprise at least one magnetically neutral region for fixing of gripper devices, weighing devices, closing systems, filling devices or other processing stations for manipulating containers.

In a further advantageous embodiment of the invention, it may be provided that a stator arrangement is constructed inside the at least one intermediate wall in at least one rack. In this way, the stator arrangement can very easily be moved out of the intermediate wall for maintenance and/or repair work.

In an alternative or additional embodiment of the invention, it may be provided that the or a boundary wall and/or the or a separating layer can be removed from the intermediate wall. In this way, the or a stator arrangement is accessible from outside the interior for maintenance work, which is advantageous in particular if the or a stator arrangement is fixed stationarily, for example in stationary racks, in the intermediate wall.

In a further advantageous embodiment of the invention, it may be provided that the protected interior has at least one through-flow zone. Advantageously, the particle concentration in the air can be reduced in a through-flow zone, which is advantageous for the purity of the product to be processed, in particular the products to be filled.

In particular, the drive surface may be configured such that the at least one mover can travel into the zone and/or within the zone. Accordingly, a through-flow zone may be implemented which has a smaller surface area than the surface area of the protected interior, and which movers can reach and travel over. It is advantageous with such a through-flow zone that less energy is required for the air flow, whereby costs can be saved. Advantageously, alternatively or additionally, a further means is provided, by which penetration of contaminants into a working region can be prevented.

In a further advantageous embodiment of the invention, it may be provided that the stator arrangement is enveloped by a sealed tunnel, wherein the drive surface is formed by an envelope of the tunnel. Thus advantageously, the drive surface may be formed on a tunnel inside the protected interior, wherein the drive surface and the mover can be installed compactly in the device.

Alternatively, it may be provided that the drive surface inside the protected area is formed independently of the envelope. In this way, in particular, a movement of the or a mover is possible separately from the envelope or tunnel, so that the or a mover moves and can be used flexibly inside the protected interior.

In a further advantageous embodiment of the invention, it may be provided that the tunnel is accessible on one side or two sides from outside the protected interior. This may be achieved for example with the access points described herein. Thus advantageously, stators of the stator arrangement can be accessed from outside the protected interior, in particular for maintenance and/or repair.

Alternatively or additionally, it may be provided that the tunnel is surrounded by the protected interior along a periphery running fully around its longitudinal extent. Thus the tunnel may be completely integrated in the protected interior, whereby an integrity of the protected interior may be particularly high. Furthermore, advantageously space may be saved outside the protected interior.

In a further advantageous embodiment of the invention, it may be provided that the protected interior has a profile body, wherein the profile body comprises the stator arrangement and the separating layer. In this way, a drive surface for movers may be formed with a level difference relative to a floor of the protected interior, which can reduce contamination arising from the floor. The profile body may be inserted or erected in the protected interior, wherein the profile body in particular has at least one foot which forms a connection to the exterior of the protected interior, so that advantageously for example electrics can be routed to the profile body, in particular the stator arrangement. The at least one foot may also advantageously serve to dissipate waste heat from the stator arrangement, so that overheating of the device can be avoided.

In particular, it may be provided that the separating layer is attached interchangeably to the profile body. Thus the profile body may be closed so that no substance exchange occurs between the stator arrangement and the protected interior. The separating layer is interchangeable, whereby advantageously faulty stator arrangements and/or those requiring maintenance can easily be exchanged.

In particular, it may be provided that the separating layer is attached by adhesive to the profile body. Thus the profile body can be closed particularly easily. The profile body may also have adhesive surfaces for the separating layer so that the separating layer is not glued to the stator arrangement. In particular, in this embodiment, thus the separating layer lies on the stator arrangement such that no air gap occurs between the separating layer and the stator arrangement. Thus the magnetic coupling of the mover and stator arrangement may be formed particularly efficiently and fault-free.

Preferably, the separating layer is formed as a film. A separating layer formed as a film is particularly easy to handle, in particular if it is glued to the profile body as described above.

The separating layer formed by the film may, in a preferred and advantageous embodiment, be a glass-fibre composite. Further magnetically neutral materials may be used alternatively and as desired by the user for forming the separating layer.

In a further advantageous embodiment of the invention, it may be provided that the tunnel and/or the profile body form/forms access points outside the protected interior. Here, the access points are advantageously formed by the end faces of the tunnel and/or profile body. In particular, this embodiment may simplify a removal of the stator arrangement e.g. for maintenance, without having to access the protected interior or contaminate this by manipulation. Thus operation in the device may be started or resumed particularly quickly.

Alternatively or additionally, for achieving the above-mentioned object, the features of the independent claim directed at a method are provided according to the invention. In particular, in this way, in a method of the type described initially, it is proposed according to the invention that the at least one object is moved by a mover on a drive surface of the protected interior up to a process station, for example a filling device, and is filled by the filling device, wherein the filling device is positioned in the protected interior, in particular on the drive surface, or on a further mover. Preferably, it is provided that the mover with the at least one object carries out a lift movement to the filling device which is situated above the horizontal floor level of the device. Thus the vertically arranged filling device does not affect the transport path of the device, whereby further movers can be conducted in flexible fashion to further process stations.

Alternatively, also a movement of the filling device to the mover with the at least one object is conceivable.

Alternatively or additionally, for achieving the above-mentioned object, the features of the independent claim directed at a usage are provided according to the invention. In particular, in this way, on use in the fashion described initially, it is proposed according to the invention that a boundary wall of a protected interior is used as a drive surface of at least one mover which is coupled to a stator arrangement. It is preferably provided that the stator arrangement is positioned outside the protected interior. Thus a physical separation of mover and stator arrangement is possible, which are not usually separated in a room. It is advantageous here that maintenance and/or adaptation of the stator arrangement of a protected interior, for example an isolator or containment, can be carried out in flexible fashion.

BRIEF DESCRIPTION OF THE DRAWINGS

The invention is now described in more detail with reference to exemplary embodiments but is not restricted to the exemplary embodiments shown. Further exemplary embodiments arise from the combination of features of individual or multiple claims with one another and/or with individual or multiple features of the exemplary embodiments. The drawings show, partially in cross-section:

DETAILED DESCRIPTION

Figure 1:
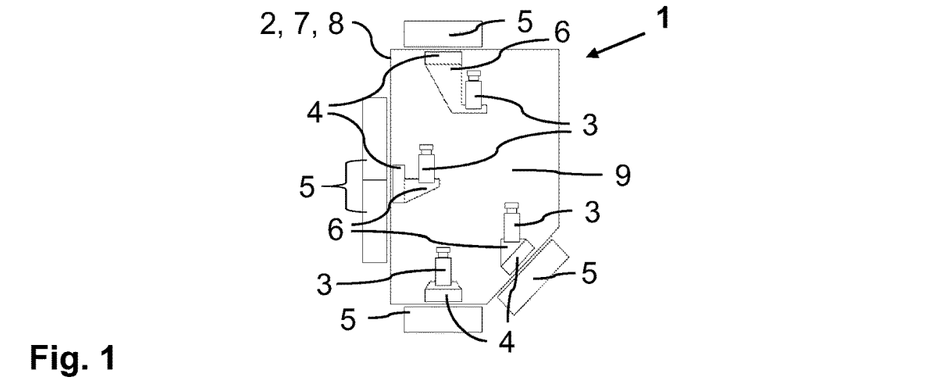
FIG. 1 a side view of a device with stator arrangements and movers in different orientations, FIG. 2 a side view of a device with a coupling region, FIG. 3 a side view of a device with racks, FIG. 4 a side view of a device with vertically arranged process stations, FIG. 5 a side view of a device with two chambers, FIG. 6 a side view of a device with two chambers and a stator arrangement in an intermediate wall, FIG. 7 a side view of a device with two chambers and a process station which is fixed in one chamber and protrudes into a second chamber, FIG. 8 a front view of a device with a mover-stator arrangement situated in a protected interior, FIG. 9 a side view of a device with a stator arrangement encased in a tunnel, FIG. 10 a front view of a device with a stator arrangement encased in a tunnel, FIG. 11 a front view of a device with a stator arrangement encased in a profile body, FIG. 12 a side view of the device from FIG. 11 with a stator arrangement encased in the profile body, FIG. 13 a detailed side view of a variant of FIG. 11, FIG. 14 a detailed side view of a further variant of FIG. 11.

FIG. 1 shows a device 1 according to the invention, designated as a whole with 1. The device 1 has a housing 2 which has a protected interior 9. For introduction and discharge of the at least one object 3 into or from the protected interior 9, the device 1 according to the invention has locks and/or decontamination regions normally used for isolators or containments.

Alternatively or additionally, the device 1 and/or the housing 2 may be movable.

In the protected interior 9, at least one object 3 is situated on the floor, on the roof, on a vertical and sloping wall, wherein the at least one object 3 is positioned on a receiver 6 of a mover 4. The at least one mover 4 is magnetically coupled to a stator arrangement 5.

FIG. 1 shows that four stator arrangements 5, each composed of a stator or several stators, are positioned outside the protected interior 9 on a vertical, horizontal or sloping wall. A stator arrangement 5 may alternatively also be positioned in the housing 2 and/or in a boundary wall 8 and/or between the housing 2 and the boundary wall 8.

The at least one mover 4 may be operated on the drive surface 7 passively, with e.g. integrated permanent magnets (not shown), or actively, with e.g. an integrated coil pack (not shown). Active operation of the at least one mover 4 may take place by a preferably contactless movement, in particular a movement along the drive surface, or with a component transverse thereto, a rotation and/or a tilting, relative to the drive surface 7. In the embodiment shown here, the drive surface 7 forms the boundary wall 8 of the device 1. The device 1 according to the invention may comprise, in addition, conventional transport devices such as flow conveyors, star wheels and/or rake systems for moving the at least one object 3.

Figure 2:
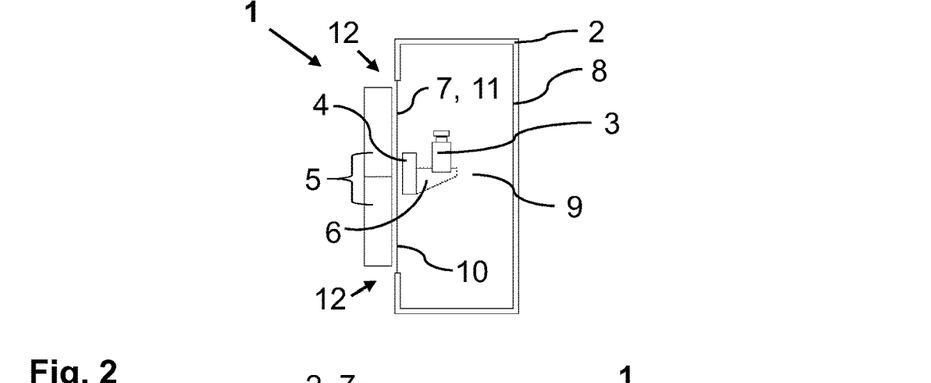

In an embodiment according to FIG. 2, a device 1 has a coupling region 10 which is machined into a vertical boundary wall 8 of the housing 2. The surface area of the coupling region 10 is here smaller than the surface area of the vertical boundary wall 8. The vertical boundary wall 8 may have various process stations 15 (not shown) positioned inside or outside the coupling region 10 and on sides of the protected interior 9. These process stations 15 may be approached by at least one mover 4 for manipulation of at least one object 3. In FIG. 2, the drive surface 7 is implemented as a magnetically neutral separating layer 11, for example a separating layer 11 made of glass, special steel, gas-tight plastic or composite material. Furthermore, the coupling region 10 is positioned and stabilised on the housing 2 and/or the boundary wall 8 by magnetically neutral carrier components 12, for example latch bolts and/or angle brackets and/or profile rails and/or ribs and/or vertical stiffenings.

Alternatively or additionally, the stator arrangement 5 may also be connected to the housing 2 and/or the separating layer 11 by carrier components 12.

Figure 3:
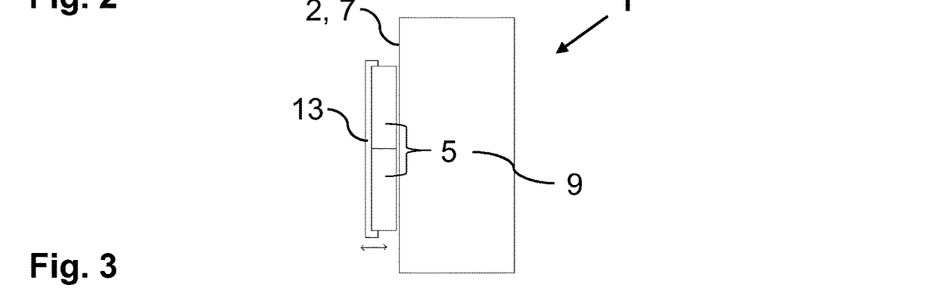

In an embodiment according to FIG. 3, a stator arrangement 5 is constructed in a rack 13 outside the protected interior 9. For repair and/or maintenance work for example, the stator arrangement 5 may be moved away from a contact position close to the boundary wall 8 by means of the rack 13, so that the stator arrangement 5 is accessible.

In addition, the rack 13 may have a drive (not shown) for moving individual packets of the stator arrangement 5 and/or the stator arrangement 5 within a or between several drive surfaces 7.

Figure 4:
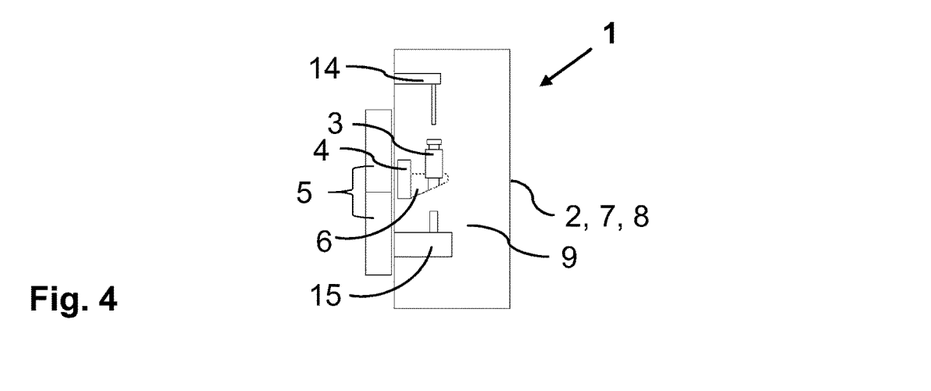

In the embodiment according to FIG. 4, a stator arrangement 5 is arranged on a vertical wall. A mover 4 holding at least one object 3 on a receiver 6 is arranged in the protected interior 9 of the device 1. A filler device 14 is fixedly mounted on the vertical wall above the mover 4, and a further process station 15 below the mover 4. The mover 4 may approach the filler device 14 for filling the at least one object 3. After filling, the mover 4 may move with the at least one object 3 to the process station 15 which may preferably be a weighing device for measuring the fill level of the at least one object 3.

Alternatively, the filling device 14 and/or the process station 15 may be positioned on a mover 4 (not shown). Thus the mover 4 can be moved relative to the filling device 14 and/or the process station 15.

In a further exemplary embodiment, the process station 15 and/or the filling device 14 may be arranged on a conventional movement system, in particular as already stated.

Thus with a device 1 according to the invention, a method may be carried out for filling an object, preferably a vial, a syringe, a cartridge and/or an ampoule or an injection bottle, which could take place as follows.

A mover 4 moves at least one object 3, which is not or is only partially filled, to a weighing device to determine the empty weight of the at least one object 3, which is not or is only partially filled. Then the mover 4 moves the at least one object 3, which is not or is only partially filled, along a vertical drive surface 7 to a filling device 14 which fills the at least one object 3, which is not or is only partially filled. After filling, the mover 4 with the at least one filled object 3 may be moved to a further process station 15, for example back to the further weighing device, for further process steps.

Figure 5:
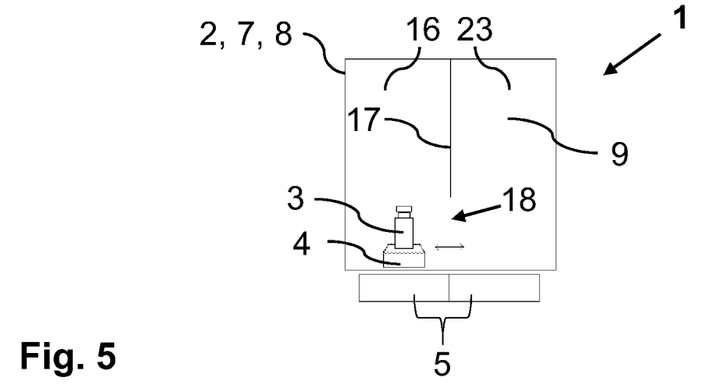

FIG. 5 shows a device 1 with two chambers 16, 23. The two chambers 16, 23 are formed by an intermediate wall 17 and connected together via at least one small access opening 18. The stator arrangement 5 shown here is formed on the floor of the device 1. At least one mover 4 can be moved in a horizontal movement through the at least one small access opening 18 between the two chambers 16, 23.

Alternatively or additionally, a stator arrangement 5 may also be arranged on a vertical and/or sloping wall in order to move the at least one mover 4 between the at least two chambers 16, 23.

Figure 6:
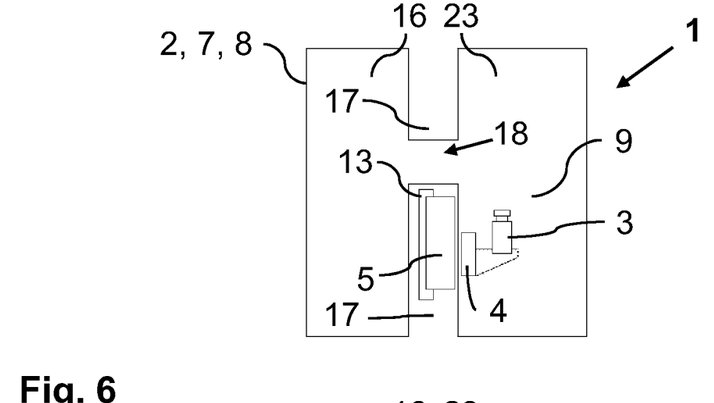

In the embodiment according to FIG. 6, at least one rack 13 with at least one stator arrangement 5 is positioned on an intermediate wall 17 of two chambers 16, 23. The at least one mover 4 may be moved vertically and/or horizontally on the intermediate wall 17. Further stator arrangements 5 (not shown) may move the at least one mover 4 into or between the at least two chambers 16, 23.

Figure 7:
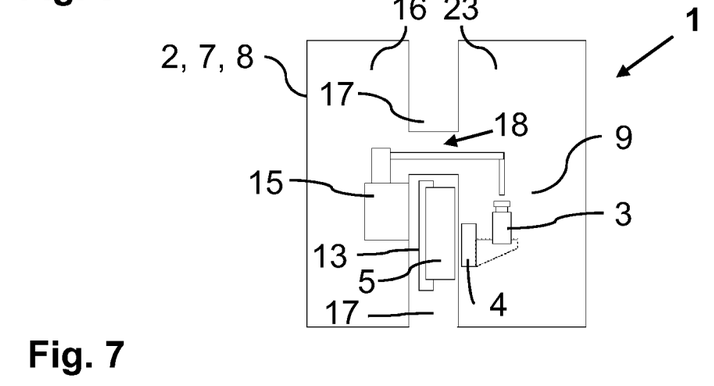

FIG. 7 shows a device 1 with two chambers 16, 23 in which a process station 15 is positioned on a vertical wall of a first chamber 16. The process station 15 illustrated here protrudes through an access opening 18 into the second chamber 23, but in alternative embodiments may also protrude into several chambers 16, 23. The stator arrangement 5 is encased in an intermediate wall 17. A mover 4 present in the second chamber 23 may move via the magnetic coupling with the stator arrangement 5 up to the process stations 15 where processing of an object 3 may be carried out.

Alternatively or additionally, the or a part of the process station 15 may be movable, for example movable within a chamber 16, 23 or between at least two chambers 16, 23.

Figure 8:
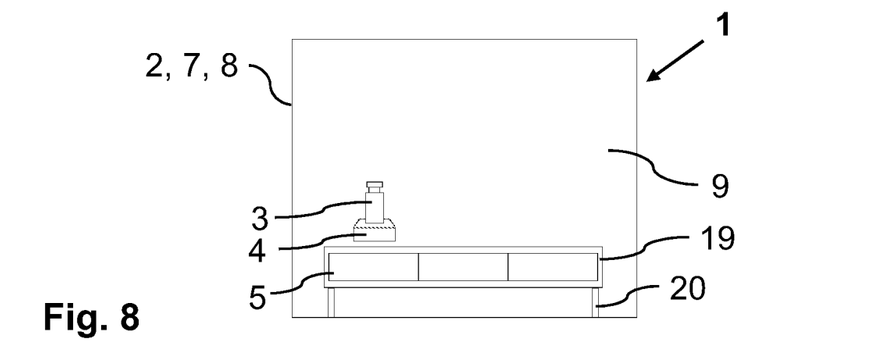

In an embodiment according to FIG. 8, inside the protected interior 9 of the device 1, a mover 4 is arranged with a corresponding stator arrangement 5, wherein the stator arrangement 5 is surrounded on all sides by a sealed and magnetically neutral envelope 19. The envelope 19 and stator arrangement 5 are robustly positioned in the protected interior 9 by two anchors 20. The number of supporting anchors 20 may be structured alternatively, so an envelope 19 may be positioned in the protected interior 9 without anchors, with one anchor or with more than two anchors 20.

Alternatively or additionally, the envelope 19 with mover 4 and stator arrangement 5 may be suspended and/or clamped in the protected interior 9.

Figure 9:
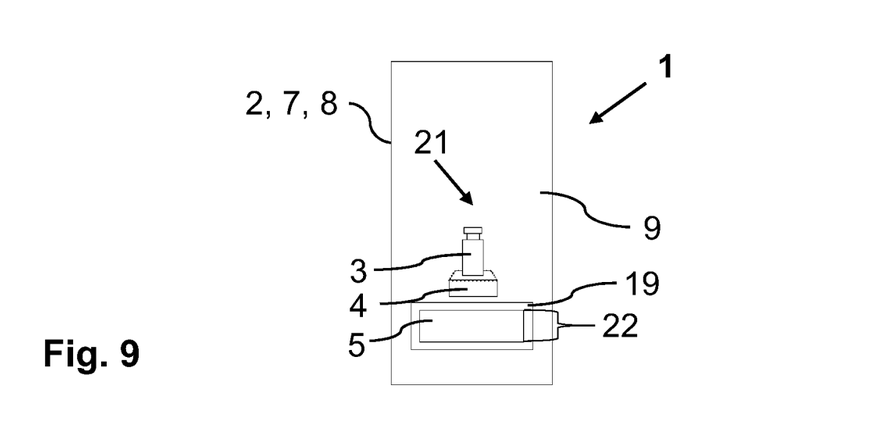

FIG. 9 shows a side view of a device 1 in which an object 3 is situated on a mover 4 inside a through-flow zone 21. Here, as known for clean rooms, filtered air is introduced from the roof into the protected interior 9 in order to displace air present therein. FIG. 9 furthermore shows that the mover 4 is magnetically coupled to a stator arrangement 5 which is tightly enveloped by a tunnel 22. The envelope 19 forming the tunnel 22 is made of magnetically neutral materials for interference-free use of the mover-stator application. This Figure does not show racks 13 or further transport vehicles which allow the stator arrangement 9 to exit the tunnel 22.

Figure 10:
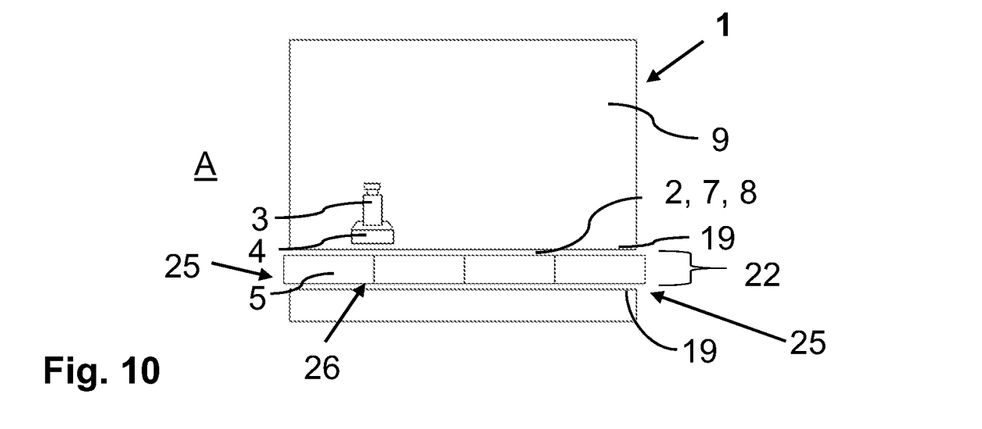

FIG. 10 shows a tunnel 22 as illustrated in particular in FIG. 9 in a front view. The drive surface 2, 7, 8 is formed by the envelope 19 of the tunnel 22.

In an embodiment not shown, the drive surface 2, 7, 8 may also be produced separately or independently of the tunnel 22 or its envelope 19 inside the protected interior 9, so that the device 1 may be configured flexibly.

Figure 11:
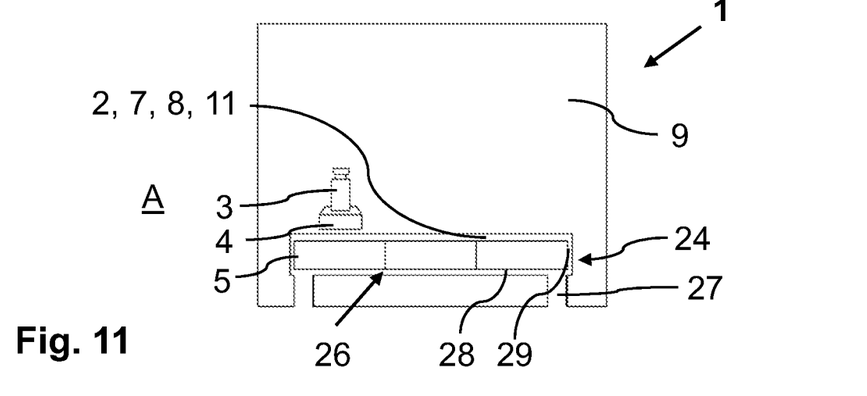
Figure 12:
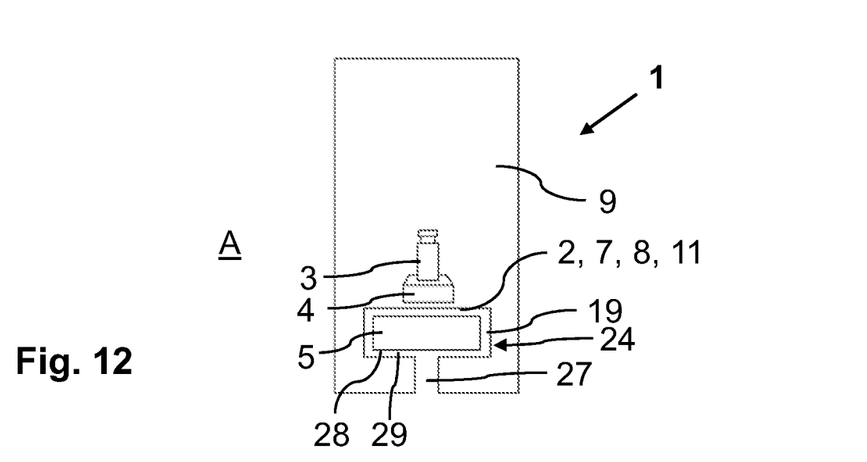

The tunnel 22 shown in FIGS. 11 and 12 is accessible on two sides from outside the protected interior 9. Thus, for example for maintenance, the stators of the stator arrangement 5 may be brought into the exterior A via the access points 25, in particular as already described with reference to FIG. 9. Thus the stators of the stator arrangement 5 may be maintained without having to enter the protected interior 9 or contaminate this by manipulation.

Such access points 25 may also be formed in a profile body 24 as described below.

The tunnel 22 is surrounded by the protected interior 9 along a full periphery running along its entire longitudinal extent.

Furthermore, FIG. 10 shows that the stator arrangement 5 is provided with an adjustment device 26 (see FIGS. 13 and 14), so that it can be adjusted as required. FIG. 11 (front view) and FIG. 12 (side view) show a device 1 with a profile body 24 situated in the protected interior 9, wherein the profile body 24 comprises the stator arrangement 5 and the separating layer 11, in particular wherein the film-like separating layer 11 is interchangeably attached to the profile body 24. The film-like separating layer 11 is applied by adhesive to adhesive surfaces of the profile body 24 and closes this.

Figure 13:
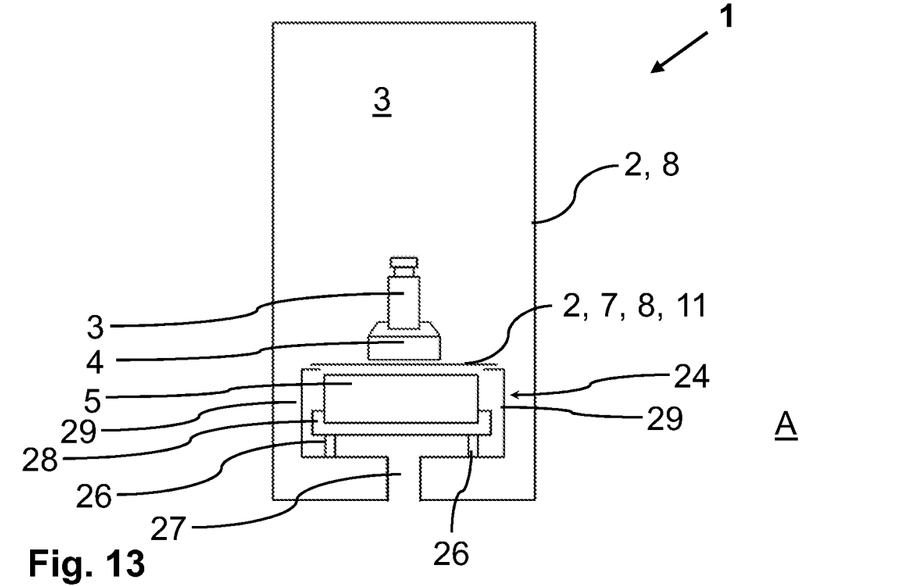
Figure 14:
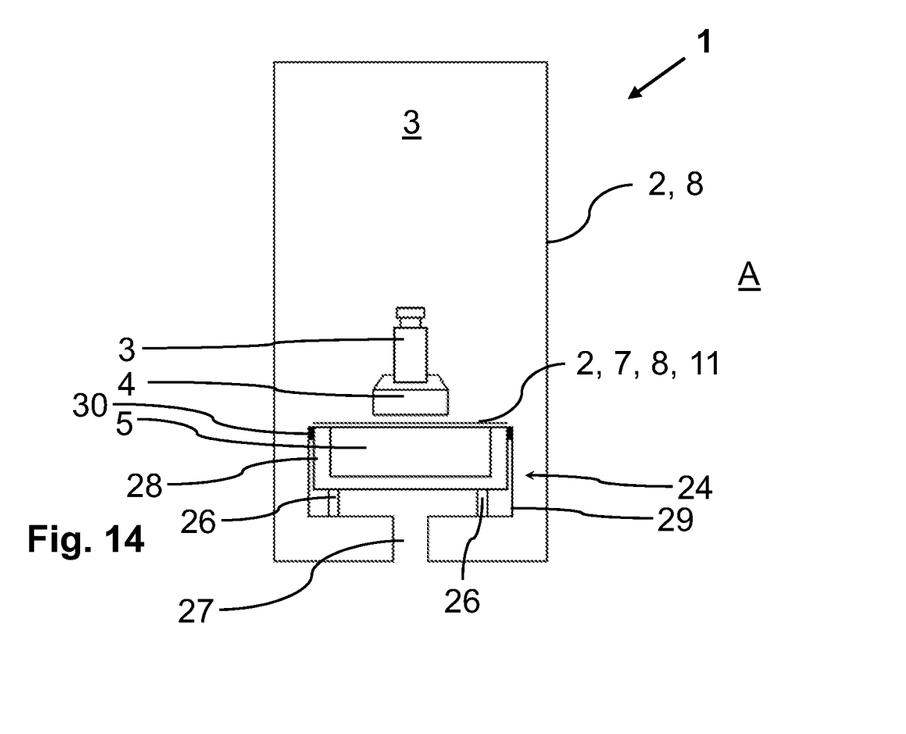

FIGS. 13 and 14 show two variants of the structure from FIGS. 11 and 12 in more detail.

In a first variant according to FIG. 13, the separating layer 11, which may for this be configured as a film, may be placed on an outer profile 29, for example of sheet metal, of the profile body 24 and bonded thereto. The inner profile, for example made of aluminium or plastic (e.g. glass fibre reinforced plastic) is arranged in the space 31 thus formed, which is connected to the exterior A via the foot 24. This inner profile 28 receives the stator arrangement 5 and is placed on adjustment devices 26 in order to align a top side of stator arrangement 5 with a termination of the outer profile 29.

In the arrangement according to FIG. 15, the separating layer 11 (also e.g. film-like) is delimited by an inner profile 28 of the profile body 24 which is preferably made of aluminium or plastic, such as GRP, or another magnetically neutral material. An outer profile 29 of the profile body 24, preferably made of sheet metal, surrounds the inner profile 28 and is sealed against the inner profile 28 by a sealing element 30, e.g. by a sealing compound such as silicone, or in the form of a sealing lip or sealing profile, such that contamination cannot enter the protected interior 9.

The separating layer 11 lies on the stator arrangement 5 so that no air gap occurs between the separating layer 11 and stator arrangement 5. Thus the magnetic coupling of the mover 4 and stator arrangement 5 is formed so as to be particularly efficient and interference-free.

The profile body 24 shown in FIGS. 11 and 12 is placed or erected in the protected interior 9 and has two feet 27 (see FIG. 11) which form a connection to the exterior A of the protected interior 9, so that advantageously, for example, electrics can be routed to or from the profile body 24, in particular the stator arrangement 5. The two feet 27 advantageously serve to dissipate waste heat produced by the stator arrangement 5. Thus overheating of the device 1 may be avoided. Via the foot 24, for example connection lines of the stator arrangement 5 may be conducted to the exterior A.

In a further exemplary embodiment, the profile body 24 is supported by just one foot 27 or by more than two feet 27.

The invention thus proposes in general a device 1 for manipulation of an object 3, wherein the object 3 is movable contactlessly on a drive surface 7 by at least one mover 4 which is magnetically coupled to a stator arrangement 5, wherein the drive surface 7 is formed as a boundary wall 8 of a protected interior 9. The use of such a flexible device 1 is preferably of interest in the foodstuff industry or pharmaceutical industry, but is not restricted to these sectors.

LIST OF REFERENCE SIGNS

1 Device
2 Housing
3 Object
4 Mover
5 Stator arrangement
6 Receiver
7 Drive surface 8 Boundary wall
9 Protected interior
10 Coupling region
11 Separating layer
12 Carrier components
13 Rack
14 Filler device
15 Process station
16 (First) chamber
17 Intermediate wall
18 Access opening
19 Envelope
20 Anchor
21 Zone
22 Tunnel
23 (Second) chamber
24 Profile body
25 Access point
26 Adjustment device
27 Foot of 24
28 Inner profile
29 Outer profile
30 Sealing element
A Exterior

The invention claimed is:

1. A device (1) for manipulating an object (3), the device comprising at least one mover (4) which is magnetically coupled to a stator arrangement (5), and a drive surface (7) that is configured as a sealed border of a protected interior (9) and the object is movable contactlessly on the drive surface.

2. The device (1) according to claim 1, wherein the stator arrangement (5) is constructed in at least one rack (13), the at least one rack (13) is mounted directly on at least one of the boundary wall (8) or on a coupling region (10), and is at least one of movable from and to a usage site or at the usage site is adjustable between a working position close to the boundary wall (8) and a position remote from the boundary wall (8).

3. The device (1) according to claim 1, wherein at least one of a boundary wall (8) or a separating layer (11) is removable from the device (1).

4. The device (1) according to claim 1, wherein the protected interior (9) has at least one through-flow zone (21).

5. The device (1) according to claim 1, wherein at least one of a) the stator arrangement (5) is arranged outside of the protected interior (9), on a boundary wall (8) thereof, or b) the at least one mover (4) is arranged in the protected interior (9).

6. The device (1) according to claim 5, wherein the boundary wall (8) of the protected interior (9) has a coupling region (10) of the stator arrangement (5) and the at least one mover (4).

7. The device (1) according to claim 6, wherein at least one of a) at least one of the boundary wall (8) or the coupling region (10) is made of a magnetically neutral separating layer (11), or b) at least one of the boundary wall (8) or the coupling region (10) is stabilised by carrier components (12).

8. The device (1) according to claim 1, wherein the stator arrangement (5) is enveloped by a tunnel (22) sealed against the protected interior (9), and the drive surface (7) is formed by an envelope (19) of the tunnel (23) or the drive surface (7) is formed inside the protected interior (9) independently of the envelope (19).

9. The device (1) according to claim 8, wherein at least one of a) the tunnel (22) is accessible on one side or two sides from outside the protected interior (9), or b) that the tunnel (22) is surrounded by the protected interior (9) along a periphery running fully around a longitudinal extent thereof.

10. The device (1) according to claim 8, wherein the protected interior (9) has a profile body (24), the profile body (24) comprises the stator arrangement (5) and a separating layer (11), and the separating layer (11) is attached interchangeably to the profile body (24).

11. The device (1) according to claim 10, wherein at least one of the tunnel (22) or the profile body (24) forms access points (25) outside the protected interior (9).

12. The device (1) according to claim 1, wherein the protected interior (9) has at least two chambers (16, 23), the at least two chambers (16, 23) are formed by an intermediate wall (17) which has at least one of a small access opening (18) or forms the boundary wall (8).

13. The device (1) according to claim 12, further comprising at least one process station (15) positioned fixedly or releasably, or arranged on a mover (4) in the protected interior (9) on the boundary wall (8), in a coupling region (10), or in one of the chambers chamber (16) and fixed in a second of the chambers (23).

14. The device (1) according to claim 12, wherein the stator arrangement (5) is arranged on at least one of a boundary wall (8), at least one coupling region (10), or two adjacent walls of the protected interior (9) such that the at least one object (3) is transportable by the at least one mover (4) at least one of inside the at least two chambers (16, 23) or through the at least one small access opening (18) of the intermediate wall (17) between the at least two chambers (16, 23).

15. The device (1) according to claim 12, wherein the stator arrangement (5) is arranged inside the at least one intermediate wall (17) between the at least two chambers (16, 23).

16. The device (1) according to claim 12, wherein the stator arrangement (5) is constructed in at least one rack (13) in the at least one intermediate wall (17).

17. A method for filling at least one object (3) with a device according to claim 1, the method comprising: moving the at least one object (3) using mover (4) on the drive surface (7) of the protected interior (9) up to a process station (15); and filling the at least one object by the filling device (14), wherein the filling device (14) is positioned in the protected interior or on a further mover (4).

* * * * *